United States Patent
Kanaoka et al.

(10) Patent No.: US 7,554,893 B2
(45) Date of Patent: Jun. 30, 2009

(54) RECORDING/REPRODUCING APPARATUS FOR OPTICAL RECORDING MEDIUM WITH PARTIAL READING CONTROLLER FOR PARTIAL READING OF INFORMATION

(75) Inventors: Toshikazu Kanaoka, Kawasaki (JP); Masakazu Taguchi, Kawasaki (JP); Akiyoshi Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 705 days.

(21) Appl. No.: 11/188,578

(22) Filed: Jul. 25, 2005

(65) Prior Publication Data
US 2006/0203689 A1    Sep. 14, 2006

(30) Foreign Application Priority Data
Mar. 14, 2005   (JP)   ............... 2005-071228

(51) Int. Cl.
*G11B 7/00*   (2006.01)

(52) U.S. Cl. .................. 369/103; 369/124.08

(58) Field of Classification Search .............. None
See application file for complete search history.

(56) References Cited

U.S. PATENT DOCUMENTS
7,116,626 B1 * 10/2006 Woods et al. ............. 369/103

FOREIGN PATENT DOCUMENTS
JP    2004-004434    1/2004

* cited by examiner

*Primary Examiner*—Paul Huber
(74) *Attorney, Agent, or Firm*—Greer, Burns & Crain, Ltd.

(57) ABSTRACT

A reproducing apparatus for an optical recording medium, comprising: a reference beam irradiator for irradiating an optical recording medium on which information is recorded by holography with a reference beam to generate a reproduction beam; a two-dimensional image pickup device capable of being partially read, which receives the reproduction beam; a partial reading controller for controlling partial reading of information on the two-dimensional image pickup device; and an information processor for performing a predetermined process by using the information to be partially read.

10 Claims, 5 Drawing Sheets

FIG.5B  SECTOR

RECORDING/REPRODUCING APPARATUS FOR OPTICAL RECORDING MEDIUM WITH PARTIAL READING CONTROLLER FOR PARTIAL READING OF INFORMATION

CROSS-REFERENCE TO RELATED APPLICATION

This application is related to Japanese application No. 2005-71228 filed on Mar. 14, 2005 whose priority is claimed under 35 USC §119, the disclosure of which is incorporated by reference in its entirety.

BACKGROUND OF THE INVENTION

1. Field of the Invention

The present invention relates to a reproducing apparatus, a recording/reproducing apparatus and a reproducing method for an optical recording medium.

2. Description of the Related Art

In holographic recording, two-dimensional digital data is multiplexedly recorded by using two light beams of a reference beam and an object beam, thereby performing three-dimensional recording. As an example of the multiplex-recording, there is an angle multiplexing method. In the angle multiplexing method, a plurality of pieces of two-dimensional information are multiplexed and recorded on the same position by varying the angle of irradiation of the reference beam (see, for example, JP-A 2004-4434).

In the case of reproducing data recorded in such a manner from a medium, the medium is irradiated with the reference beam at the same angle as that upon recording. The reference beam is diffracted by the recording medium and a reproduction beam is obtained. The reproduction beam is received by a two-dimensional image pickup device such as a CCD or a CMOS sensor. A resultant output is processed, thereby obtaining two-dimensional digital data recorded on the medium.

In the angle multiplexing method, however, the pattern of the reproduction beam is extremely sensitive to the irradiation angle of the reference beam at the time of reproduction. If the irradiation angle of the reference beam shifts even slightly, a desired reference beam pattern cannot be obtained. In the conventional method, the whole page of information is first read out, a page address is extracted from the read page, and whether the read page is a desired page or not is determined by using the extracted page address. In this method, however, when the read page is not a desired page, the whole page has to be read again, and it takes time for data reproduction. In addition, even in the case of reading a small amount of data in a page, the whole page has to be read out and it takes time to transfer the data.

SUMMARY OF THE INVENTION

The present invention has been achieved in view of the aforementioned circumstances and provides an optical recording medium reproducing apparatus and reproducing method capable of performing data reproduction and control at high speed.

The present invention provides a reproducing apparatus for an optical recording medium, comprising: a reference beam irradiator for irradiating an optical recording medium on which information is recorded by holography with a reference beam to generate a reproduction beam; a two-dimensional image pickup device capable of being partially read, which receives the reproduction beam; a partial reading controller for controlling partial reading of information on the two-dimensional image pickup device; and an information processor for performing a predetermined process by using information to be partially read.

The reproducing apparatus of the present invention comprises the two-dimensional image pickup device capable of being partially read (which is generally called partial scan in a CCD and addressable scan in a CMOS) and can perform partial reading of the device. The term "partial reading" means reading of only part of a page, and the term "page" means a unit of two-dimensional data recorded/reproduced by a single process. Therefore, as compared with the conventional case of reading a whole page, a reading process can be completed more quickly.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Reproducing Apparatus for Optical Recording Medium

The present invention provides a reproducing apparatus for an optical recording medium, comprising: a reference beam irradiator for irradiating an optical recording medium on which information is recorded by holography with a reference beam to generate a reproduction beam; a two-dimensional image pickup device capable of being partially read, which receives the reproduction beam; a partial reading controller for controlling partial reading of information on the two-dimensional image pickup device; and an information processor for performing a predetermined process by using information to be partially read.

When the information to be partially read is a position detection marker (hereinafter, also referred to as "marker"), the predetermined process may be a process to make position correction between the reproduction beam and the two-dimensional image pickup device. The marker is a predetermined known pattern used for the position correction. Usually, a plurality of markers are arranged. Preferably, the markers are arranged at least at four corners of a page. The position correction between the reproduction beam and the two-dimensional image pickup device is made by, for example, translating or turning either -the position of the two-dimensional image pickup device or an objective lens usually used for an optical system for the reproduction beam. In the present invention, a marker is partially read and, by using the partially read marker, the position correction between the reproduction beam and the two-dimensional image pickup device is made. Thus, the position correction can be made quickly.

When the information to be partially read is sector address information, the predetermined process may be a process to read a sector in which desired information is recorded.

The sector address information is information indicative of the relation between a sector address and information recorded in a sector in the sector address. In the present invention, sector address information is first partially read, a desired sector is accessed by using the partially read sector address information, and information recorded in the sector is read. Therefore, for example, in the case of frequently accessing small data, only necessary data can be partially read, so that substantial reading speed can be improved.

The predetermined process may be a process to detect contrast and focus the reproduction beam.

For example, a reproduction beam can be focused by partially reading an arbitrary bit pattern in the center region in the two-dimensional image pickup device, detecting contrast of the partially read bit pattern, and moving an objective lens usually used for an optical system for a reproduction beam so that the contrast becomes optimum. Hitherto, a light source and a focus detector dedicated to servo are used for focusing. In the present invention, such dedicated light source and detector are not necessary. Therefore, the number of parts of the reproducing apparatus can be decreased.

When the information to be partially read is a page address, the predetermined process may be a process to determine whether a page in which the page address has been read is a desired page or not.

This case is especially advantageous when the information is multiplexedly recorded on the optical recording medium.

The term "multiplexed recording" means a recording method that a plurality of pages of information are multiplexedly recorded on the same recording region. As the multiplexing method, any method such as angle multiplexing, wavelength multiplexing or phase code multiplexing may be employed. A page address is information indicative of one of the plurality of pages recorded on the same recording region. For example, in the case where information is multiplexed in pages A, B, C, D and E, a page address is information corresponding to one of A, B, C, D and E. It is assumed that an instruction of reading the page B is given to a reproducing apparatus. First, a page address is partially read. When the partially read page address is information corresponding to "B", the reproducing apparatus is performing proper reading. On the other hand, when the partially read page address is information corresponding to "C", the reproducing apparatus is performing improper reading. In this case, for example, in the case of angle multiplexing, the irradiation angle of the reference beam is re-adjusted and a page address is partially read again. In the present invention, a whole page is not read but a page address is partially read to determine whether a page in which the page address has been read is a desired page or not. Thus, the reading process can be performed at higher speed. In particular, even in the case where the page is not a desired page, waste is little and the effect of increase in overall processing speed is high.

The information to be partially read may be two or more of the marker, the sector address information and the page address, and the predetermined process may be a combination of the processes corresponding to the information to be partially read. Further, the process to detect contrast and focus the reproduction beam may be combined to the combination of the processes above.

Recording/Reproducing Apparatus for Optical Recording Medium

The present invention also provides a recording/reproducing apparatus for an optical recording medium, comprising: a reference beam irradiator for irradiating an optical recording medium on which information is recorded by holography with a reference beam to generate a reproduction beam; a two-dimensional image pickup device capable of being partially read, which receives the reproduction beam; a partial reading controller for controlling partial reading of information on the two-dimensional image pickup device; an information processor for performing a predetermined process by using the information to be partially read; and a spatial light modulator for generating an object beam corresponding to two-dimensional data in which information to be partially read is arranged in correspondence with a partial reading characteristic of the two-dimensional image pickup device.

For example, in the case where the two-dimensional image pickup device is a CMOS, the CMOS can be partially read on a block unit basis. Consequently, to conform to the characteristic, information to be partially read is arranged on the block unit basis (see FIGS. 2A and 2B). In the case where the two-dimensional image pickup device is a CCD, the CCD can be partially read on a line unit basis. Consequently, to conform to the characteristic, information to be partially read is arranged on the line unit basis (see FIGS. 5A and 5B). With such arrangement, efficient partial reading can be realized. Information to be partially read is a position detection marker, sector address information, a page address, information data or the like.

The description on the reproducing apparatus for an optical recording medium is similarly applied to the recording/reproducing apparatus as long as it does not depart from the spirit.

Reproducing Method for Optical Recording Medium

The present invention also provides a reproducing method for an optical recording medium, comprising the steps of: irradiating an optical recording medium on which information is recorded by holography with a reference beam to generate a reproduction beam; receiving the reproduction beam by a two-dimensional image pickup device capable of being partially read; partially reading information recorded on the optical recording medium by partially reading the two-dimensional image pickup device; and performing a predetermined process by using the partially read information.

When the partially read information is a position detection marker, the predetermined process may be a process to make position correction between the reproduction beam and the two-dimensional image pickup device.

When the partially read information is sector address information, the predetermined process may be a process to read a sector in which desired information is recorded.

The predetermined process may be a process to detect contrast and focus the reproduction beam.

When the partially read information is a page address, the predetermined process may be a process to determine whether a page in which the page address has been read is a desired page or not.

The method above can be carried out by using the aforementioned reproducing apparatus for an optical recording medium. Therefore, the description on the reproducing apparatus for an optical recording medium is similarly applied to the reproducing methods as long as it does not depart from the spirit.

Figure 1:
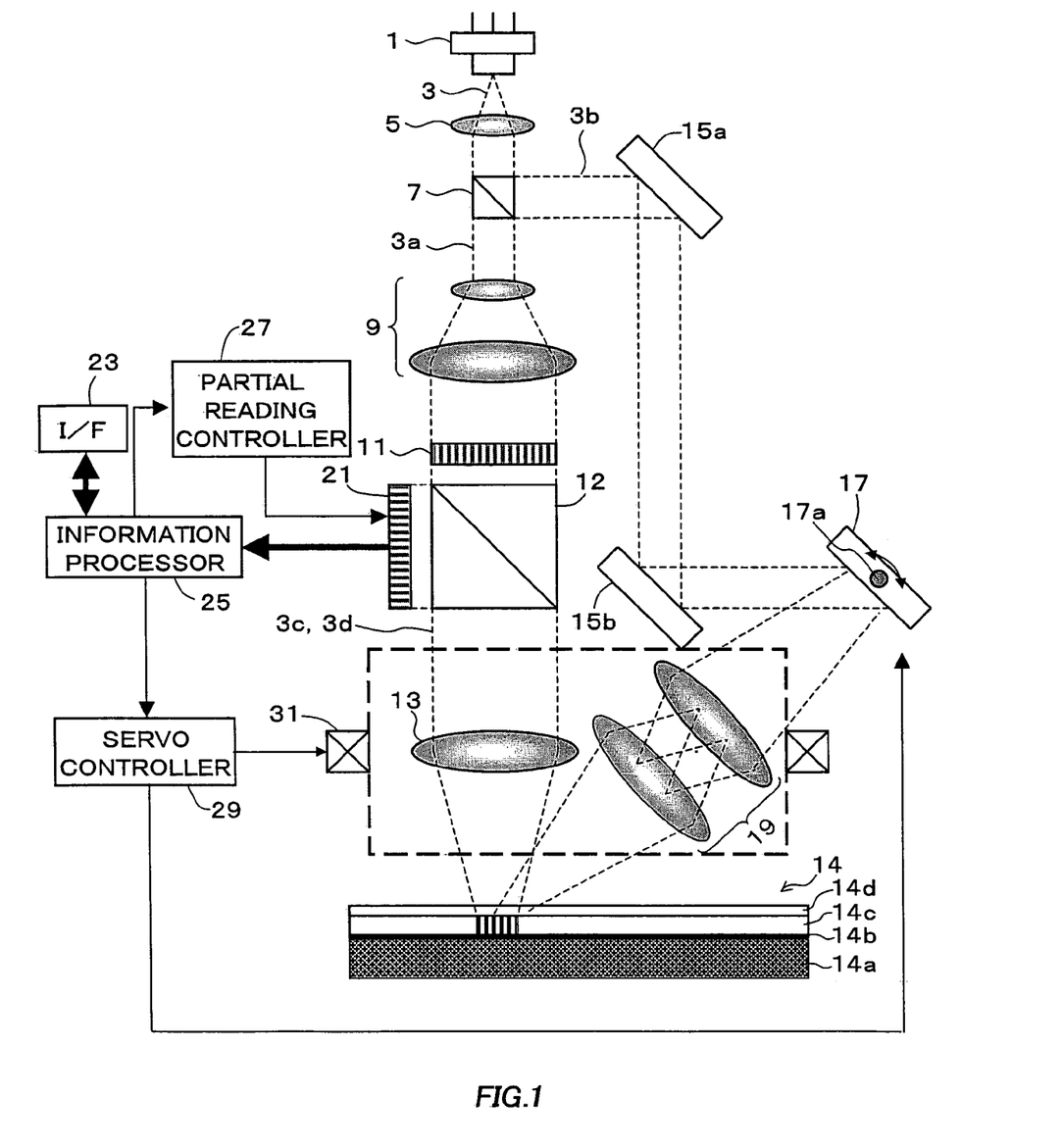
FIG. 1 is a configuration view of a recording/reproducing apparatus for an optical recording medium of the present invention.

A recording/reproducing apparatus for an optical recording medium of the present invention will further be described with reference to FIG. 1. FIG. 1 is a configuration diagram of a recording/reproducing apparatus according to an embodiment of the present invention.

A laser beam 3 emitted from a light source 1 is converted to parallel light by a collimator lens 5, and the parallel light is split into two beams 3a and 3b by a beam splitter 7. The diameter of the beam 3a is increased by a beam expander 9, and the resultant beam is converted to an object beam 3c having information by a spatial light modulator 11 (hereinafter, also referred to as "modulator 11"). The modulator 11 generates an object beam 3c corresponding to two-dimensional data in which information to be partially read is arranged in correspondence with a partial reading characteristic of a two-dimensional image pickup device which will be described later. Concrete arrangement of regions on which the information is recorded will be described later.

The object beam 3c passes through a beam splitter 12, is condensed by an objective lens 13, and falls on a holographic recording layer 14c in an optical recording medium 14 mounted on a mount part (not shown). The optical recording medium 14 has, on a substrate 14a, a reflection layer 14b, the holographic recording layer 14c and a protection layer 14d in this order.

The other beam 3b is led by mirrors 15a and 15b to a galvanometer mirror 17, is reflected by the galvanometer mirror 17, and falls on the same position as the object beam 3c as a reference beam by a pair of lenses 19. The galvanometer mirror 17 turns around an axis 17a perpendicular to the drawing sheet in accordance with an instruction of a servo controller 29 which will be described later, and changes the reflection angle of the beam 3b. Even in the case where the reflection angle of the beam 3b changes by the action of the pair of lenses 19, the beam 3b falls on almost the same position as a reference beam having a different incident angle. When the incident angle of the reference beam 3b varies, various interference fringe patterns are recorded on the medium 14. Consequently, by varying the angle of the galvanometer mirror, angle multiplex recording is realized.

At the time of reproduction, the beam 3a is interrupted by the modulator 11 (or the beam 3a is interrupted by a shutter or the like which is provided additionally) to irradiate the medium 14 only with the reference beam 3b. When an interference fringe pattern in the holographic recording layer 14c is irradiated with the beam reflected by the reflection layer 14b of the medium 14, the beam is diffracted by the interference fringe pattern, thereby generating a reproduction beam 3d. The reproduction beam 3d travels from the medium 14 toward the objective lens 13, is reflected by the beam splitter 12, and is detected by a two-dimensional image pickup device 21 (hereinafter, also referred to as "device 21") such as a CMOS or CCD, so that information is reproduced. The device 21 is a device which can be partially read. The partial reading is performed under control of a partial reading controller 27.

The information processor 25 receives a read request from a higher-order apparatus such as a personal computer via an I/F 23 and instructs the partial reading controller 27 to read information partially. Partially read information is processed by an information processor 25 and is used for position correction between the reproduction beam 3d and the device 21, adjustment of the irradiation angle of the reference beam, and the like. For example, in the case where a marker is partially read, an instruction is given from the information processor 25 to the servo controller 29. The servo controller 29 drives an actuator 31 for driving the objective lens 13 and the pair of lenses 19 to perform tilt correction, aberration correction, turn correction or the like.

Embodiment using CMOS

Figure 2A:
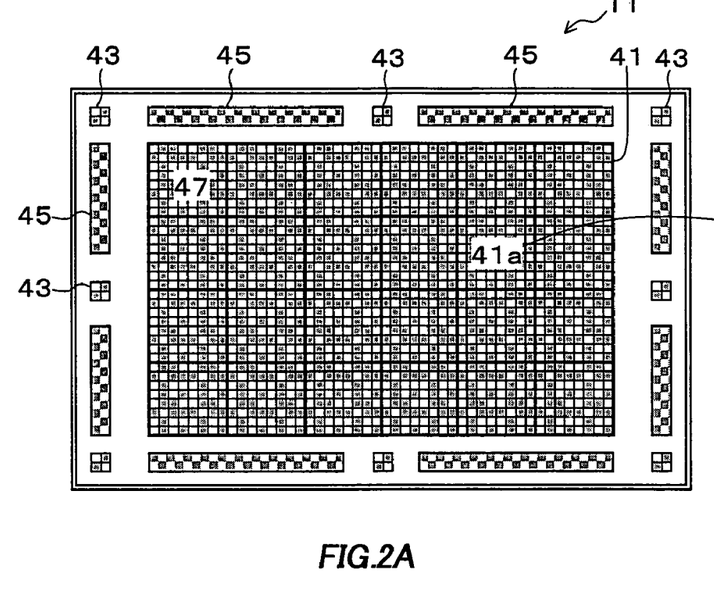
FIG. 2A shows an example of arrangement of two-dimensional recording data on a spatial light modulator and FIG. 2B shows a shape of a single sector in the arrangement, in the case of using a CMOS, according to the present invention.
Figure 2B:
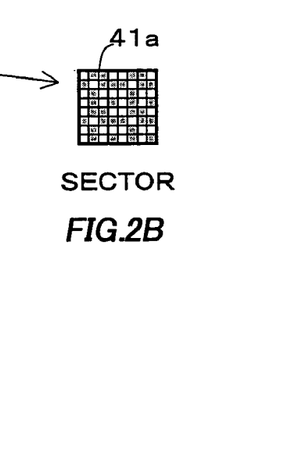

FIG. 2A shows an example of arrangement of two-dimensional recording data on the modulator 11, and FIG. 2B shows a single sector in the arrangement, in the case of using a CMOS capable of being partially read as the device 21.

The CMOS is a device capable of being partially read on a block unit basis. For example, in a data region 41, sectors 41a are arranged in matrix as shown in FIG. 2A. Marker regions 43 are provided at the corner portions and the center portions of sides of the modulator 11. A page address region 45 is provided between neighboring marker regions 43 so that partial reading can be performed in each region. An upper-end left-end sector in the data region 41 is a sector address information region 47. Marker, page address and sector address information is recorded in the regions 43, 45 and 47, respectively.

In FIG. 2A, in order to improve reliability, a plurality of page address regions 45 are provided. Alternatively, the number of page address regions 45 may be one. In the arrangement mentioned above, when there is a recording request, two-dimensional data is constituted so that the user data, page address and the like are arranged in the regions 41, 43, 45 and 47, and all of the data is written into the optical recording medium 14.

At the time of reproduction, the optical recording medium 14 is irradiated with the reference beam 3b, the reproduction beam 3d in which the arrangement of the regions 41, 43, 45 and 47 upon recording is maintained is generated, and the reproduction beam 3d is received by the device 21.

Figure 3:
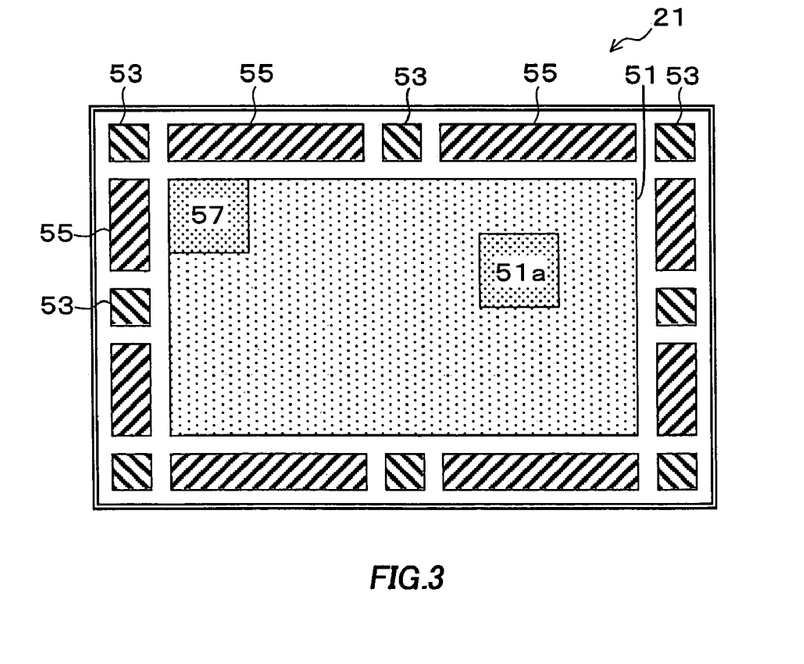
FIG. 3 shows an example of arrangement of partial reading regions on the CMOS, according to the present invention.
Figure 4:
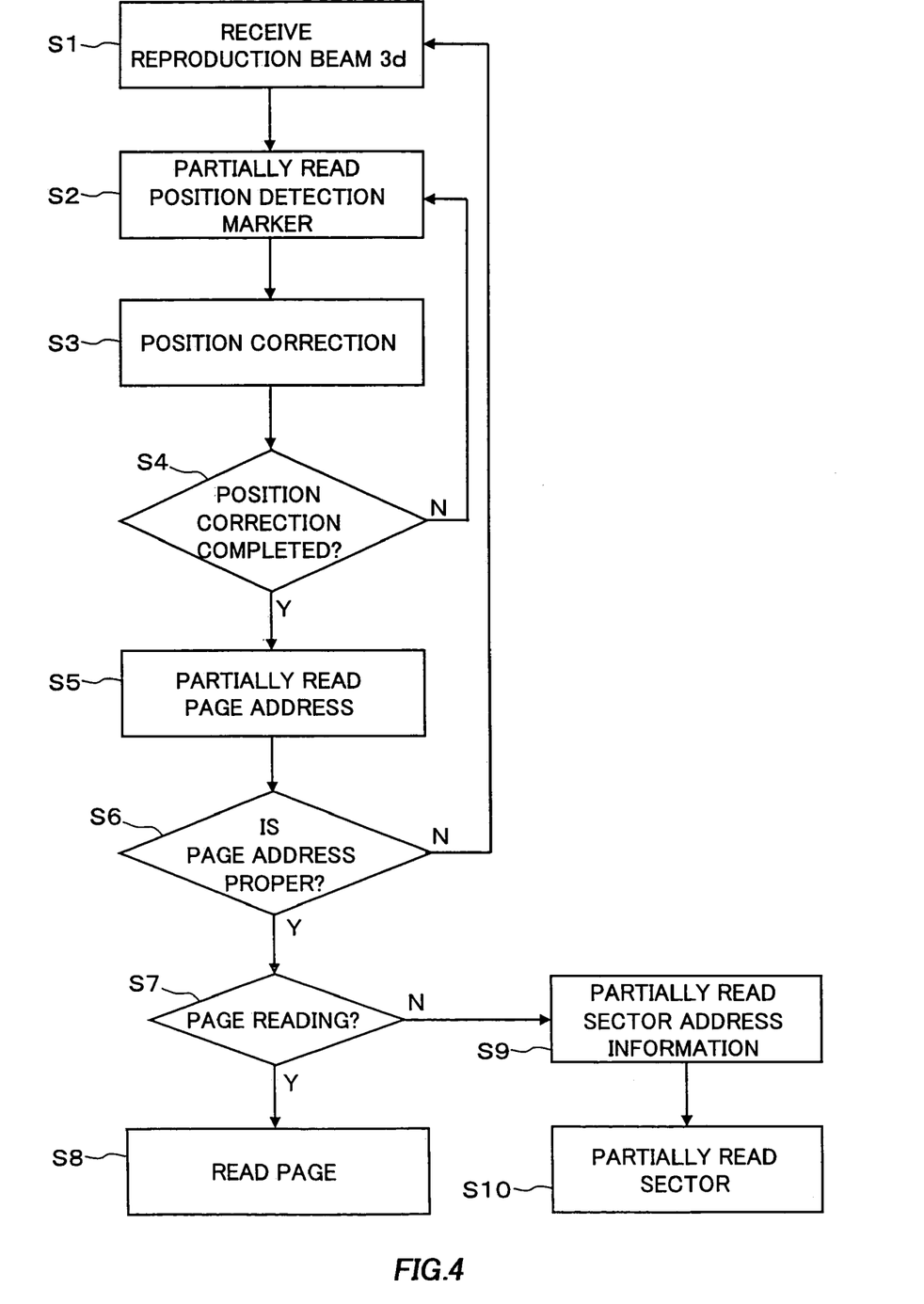
FIG. 4 is a flowchart showing a partial reading method in the case of using the CMOS, according to the present invention.

A method of partially reading the device 21 will now be described with reference to FIGS. 3 and 4. FIG. 3 shows a photoreception surface of the device 21 and shows an example of arrangement of partial reading regions on the device 21. FIG. 4 is a flowchart showing the partial reading method. It is assumed that a user data reading request is sent from a higher-order apparatus such as a personal computer and a reference beam for reading a page corresponding to the request is emitted.

In S1, when the optical recording medium 14 is irradiated with the reference beam 3b, the device 21 receives the reproduction beam 3d. When the beam 3d is received, information corresponding to light intensity pixel by pixel is held.

In S2, under control of the partial reading controller 27, in regions 53 corresponding to the marker regions 43, the markers are partially read. The partially read markers are sent to the information. processor 25.

In S3, the information processor 25 checks whether a partially read marker matches a predetermined known pattern or not. In the case of mismatch, an instruction of making position correction between the reproduction beam 3d and the device 21 is given to the servo controller 29. The servo controller 29 drives the actuator 31 for driving the objective lens 13 and the pair of lenses 19 to make tilt correction, aberration correction, turn correction and the like.

In S4, whether the position correction has been completed or not is determined. In the case where the position correction has been completed, the program proceeds to S5. In the case where the position correction has not been completed, the program returns to S2, partial reading of a marker is performed again in the regions 53, and position correction is made.

In S5, a page address is partially read in a region 55 corresponding to the page address region 45. The partially read page address is sent to the information processor 25. In S6, the information processor 25 checks whether the page address is proper or not to determine whether a page in which the page address has been read is a desired page or not. In the case where the page address is not proper, the servo controller 29 re-adjusts the angle of the galvanometer mirror 17 in accordance with an instruction from the information processor 25. After the re-adjustment, the program returns to S1 and a reproduction beam 3d is received again. In the case where the page address is proper, the program proceeds to S7.

In S7, when the reading request is a request for reading a whole page, the program proceeds to S8 where information is read in a region 51 corresponding to the data region 41. In the case of not reading the whole page, but partially reading a sector in which desired information is recorded, the program proceeds to S9 where sector address information is partially read in a region 57 corresponding to the sector address information region 47. After that, the program proceeds to S10 where the address of the sector 41a in which desired information is recorded is checked on the basis of the sector address information, and partial reading is performed in a region 51a corresponding to the sector 41a.

Various modifications can be considered for the partial reading method. All of the marker, page address and sector address information may be simultaneously partially read. Alternatively, at least two out of the marker, page address and sector address information may be simultaneously partially read. For example, after partially reading both of the marker and the page address (S2 and S5), steps of S3 and S6 and subsequent steps may be performed.

Embodiment using CCD

Figure 5A:
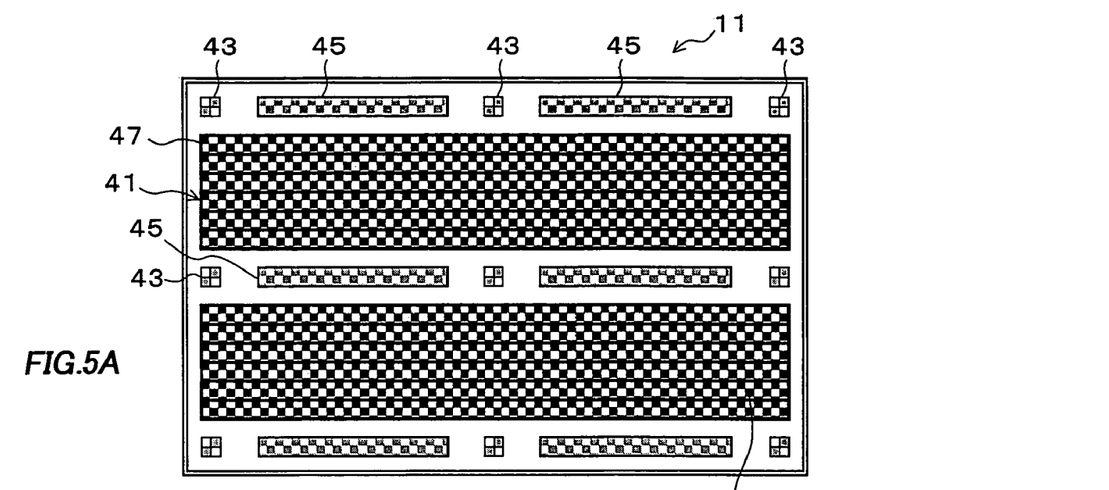
FIG. 5A shows an example of arrangement of two-dimensional recording data on a spatial light modulator and FIG. 5B shows a shape of a single sector in the arrangement, in the case of using a CCD, according to the present invention.
Figure 5B:
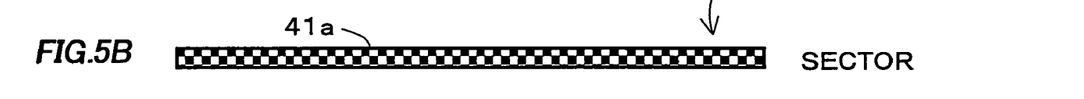

FIG. 5A shows an example of arrangement of two-dimensional recording data on the modulator 11, and FIG. 5B shows a single sector in the arrangement, in the case of using a CCD capable of being partially read as the device 21.

The CCD is a device capable of being partially read on a line unit basis. For example, in a data region 41., sectors 41 a are arranged in parallel as shown in FIG. .5A. Marker regions 43 are provided at the corner portions, the center portions of sides and the center portion of the modulator 11. A page address region 45 is provided between neighboring marker regions 43 so that partial reading can be performed in each region. An upper-end sector in the data region 41 is a sector address information region 47. Marker, page address and sector address information is recorded in the regions 43, 45 and 47, respectively.

In FIG. 5A, in order to improve reliability, a plurality of page address regions 45 are provided. Alternatively, the number of page address regions 45 may be one. In the arrangement mentioned above, when there is a recording request, two-dimensional data is constituted so that the user data, page address and the like are arranged in the regions 41, 43, 45 and 47., and all of the data is written into the optical recording medium 14.

At the time of reproduction, the optical recording medium 14 is irradiated with the reference beam 3b, the reproduction beam 3d in which the arrangement of the regions 41, 43, 45 and 47 upon recording is maintained is generated, and the reproduction beam 3d is received by the device 21.

Figure 6:
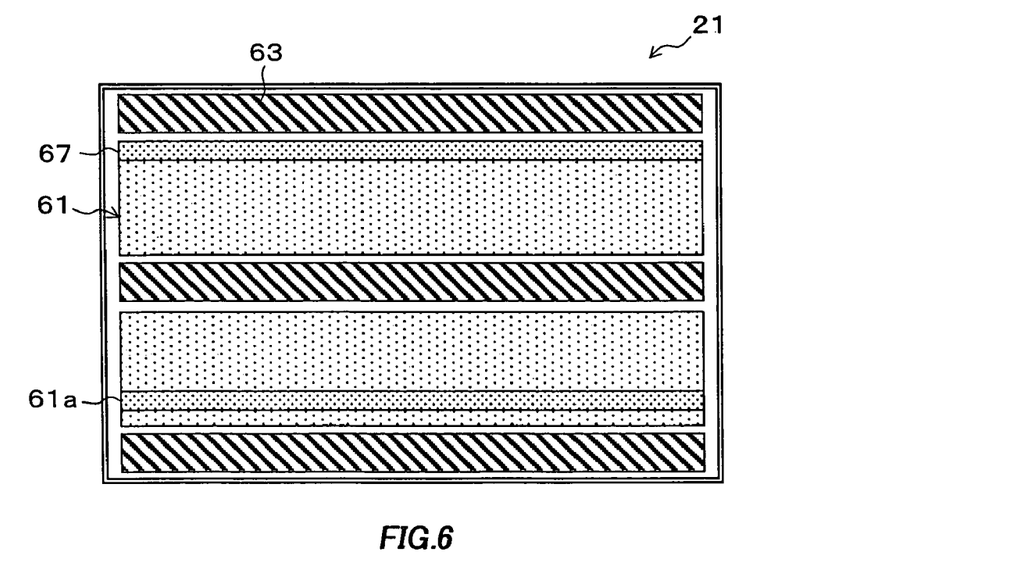
FIG. 6 shows an example of arrangement of partial reading regions on the CCD, according to the present invention.
Figure 7:
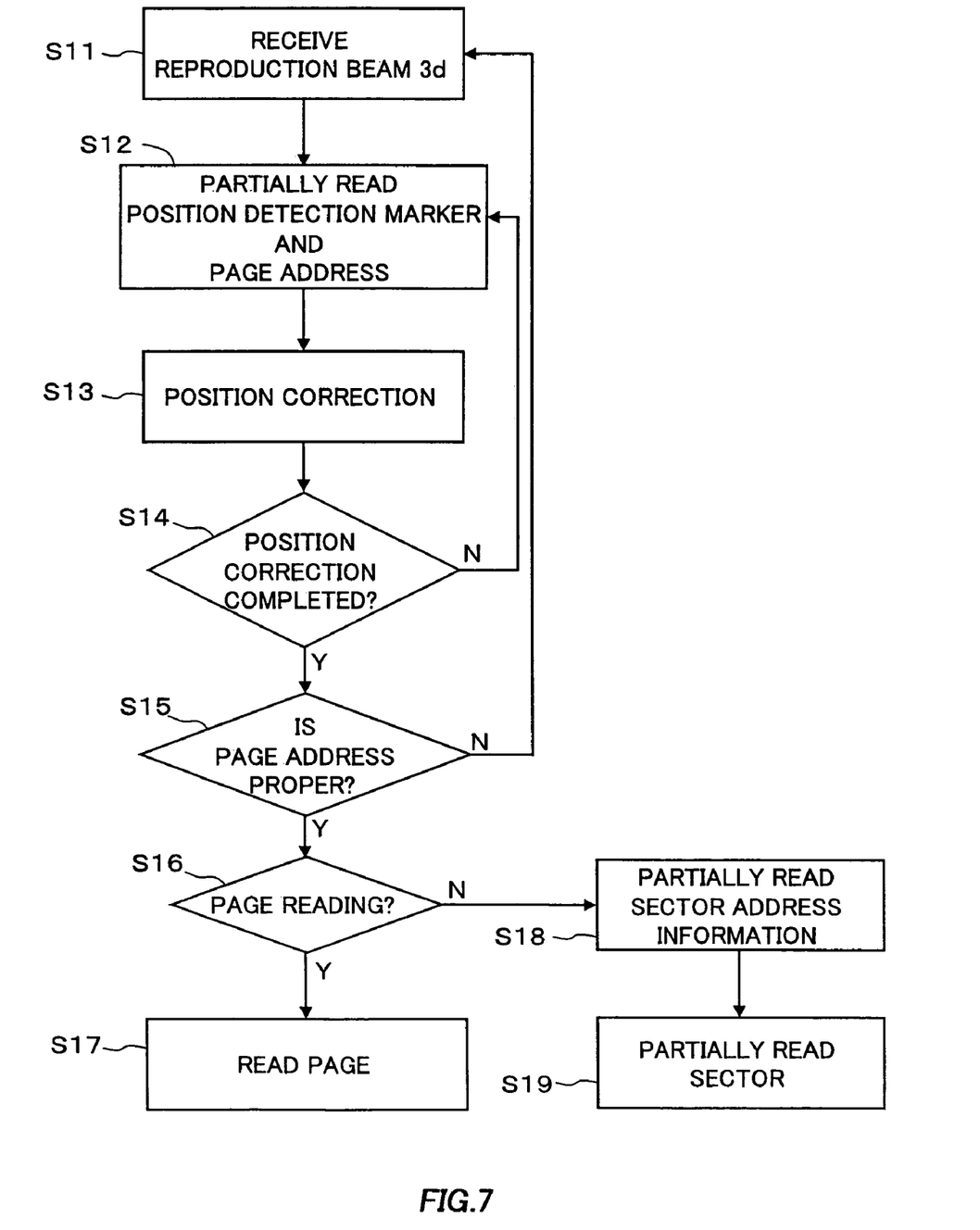
FIG. 7 is a flowchart showing a partial reading method in the case of using the CCD, according to the present invention.

A method of partially reading the device 21 will now be described with reference to FIGS. 6 and 7. FIG. 6 shows a photoreception surface of the device 21 and shows an example of arrangement of partial reading regions on the device 21. FIG. 7 is a flowchart showing the partial reading method. It is assumed that a user data reading request is sent from a higher-order apparatus such as a personal computer and a reference beam for reading a page corresponding to the request is emitted.

In S11, when the optical recording medium 14 is irradiated with the reference beam 3b, the device 21 receives the reproduction beam 3d. When the beam 3d is received, information corresponding to light intensity pixel by pixel is held.

In S12, under control of the partial reading controller 27, in regions 63 corresponding to the marker regions 43 and the page address regions 45, the markers and page addresses are partially read. The partially read markers and page addresses are sent to the information processor 25.

In S13, the information processor 25 checks whether a partially read marker matches a predetermined known pattern or not. In the case of mismatch, an instruction of making position correction between the reproduction beam 3d and the device 21 is given to the servo controller 29. The servo controller 29 drives the actuator 31 for driving the objective lens 13 and the pair of lenses 19 to make tilt correction, aberration correction, turn correction and the like.

In S14, whether the position correction has been completed or not is determined. In the case where the position correction has been completed, the program proceeds to S15. In the case where the position correction has not been completed, the program returns to S12, partial reading of a marker and page address is performed again in the regions 63, and position correction is made.

In S15, the information processor 25 checks whether the page address is proper or not to determine whether a page in which the page address has been read is a desired page or not. In the case where the page address is not proper, the servo controller 29 re-adjusts the angle of the galvanometer mirror 17 in accordance with an instruction from the information processor 25. After the re-adjustment, the program returns to S11 and a reproduction beam 3d is received again. In the case where the page address is proper, the program proceeds to S16.

In S16, when the reading request is a request for reading a whole page, the program proceeds to S17 where information is read in a region 61 corresponding to the data region 41. In the case of not reading the whole page but partially reading a sector in which desired information is recorded, the program proceeds to S18 where sector address information is partially read in a region 67 corresponding to the sector address information region 47. After that, the program proceeds to S19 where the address of the sector 41a in which desired information is recorded is checked on the basis of the sector address information, and partial reading is performed in a region 61a corresponding to the sector 41a.

In another embodiment, all of the marker, page address and sector address information may be simultaneously partially read. Alternatively, before the position correction (S13), determination whether the page address is proper or not (S15) may be made.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A recording/reproducing apparatus for an optical recording medium, comprising:

a reference beam irradiator for irradiating an optical recording medium on which information is recorded by holography with a reference beam to generate a reproduction beam;

a two-dimensional image pickup device capable of being partially read, which receives the reproduction beam;

a partial reading controller for controlling partial reading of information on the two-dimensional image pickup device;

an information processor for performing a predetermined process by using the information to be partially read; and a spatial light modulator for generating an object beam corresponding to two-dimensional data in which information to be partially read is arranged in correspondence with a partial reading characteristic of the two-dimensional image pickup device, wherein the spatial light modulator is provided with sectors and the information to be partially read is arranged therein on a block unit basis, the spatial light modulator being provided with a plurality of position detection markers as one of the information to be partially read and arranged at corner portions and center portions of sides of the spatial light modulator, and the sectors being arranged in a matrix at a center portion of the spatial light modulator.

2. The apparatus according to claim 1, wherein
the information to be partially read is a position detection marker, and
the predetermined process is a process to make position correction between the reproduction beam and the two-dimensional image pickup device.

3. The apparatus according to claim 1, wherein
the information to be partially read is sector address information, and
the predetermined process is a process to read a sector in which desired information is recorded.

4. The apparatus according to claim 1, wherein
the predetermined process is a process to detect contrast and focus the reproduction beam.

5. The apparatus according to claim 1, wherein
the information to be partially read is a page address, and
the predetermined process is a process to determine whether a page in which the page address has been read is a desired page or not.

6. A recording/reproducing apparatus for an optical recording medium, comprising:

a reference beam irradiator for irradiating an optical recording medium on which information is recorded by holography with a reference beam to generate a reproduction beam;

a two-dimensional image pickup device capable of being partially read, which receives the reproduction beam;

a partial reading controller for controlling partial reading of information on the two-dimensional image pickup device;

an information processor for performing a predetermined process by using the information to be partially read; and a spatial light modulator for generating an object beam corresponding to two-dimensional data in which information to be partially read is arranged in correspondence with a partial reading characteristic of the two-dimensional image pickup device, wherein the spatial light modulator is provided with sectors and the information to be partially read is arranged therein on a line unit basis, the spatial light modulator being provided with a plurality of position detection markers as one of the information to be partially read and arranged at corner portions and center portions of sides of the spatial light modulator and arranged between the sectors, and the sectors being arranged almost at a center portion of the spatial light modulator into long forms in parallel in one direction.

7. The apparatus according to claim 6, wherein
the information to be partially read is a position detection marker, and
the predetermined process is a process to make position correction between the reproduction beam and the two-dimensional image pickup device.

8. The apparatus according to claim 6, wherein
the information to be partially read is sector address information, and
the predetermined process is a process to read a sector in which desired information is recorded.

9. The apparatus according to claim 6, wherein
the predetermined process is a process to detect contrast and focus the reproduction beam.

10. The apparatus according to claim 6, wherein
the information to be partially read is a page address, and
the predetermined process is a process to determine whether a page in which the page address has been read is a desired page or not.

* * * * *